Patented Feb. 16, 1932

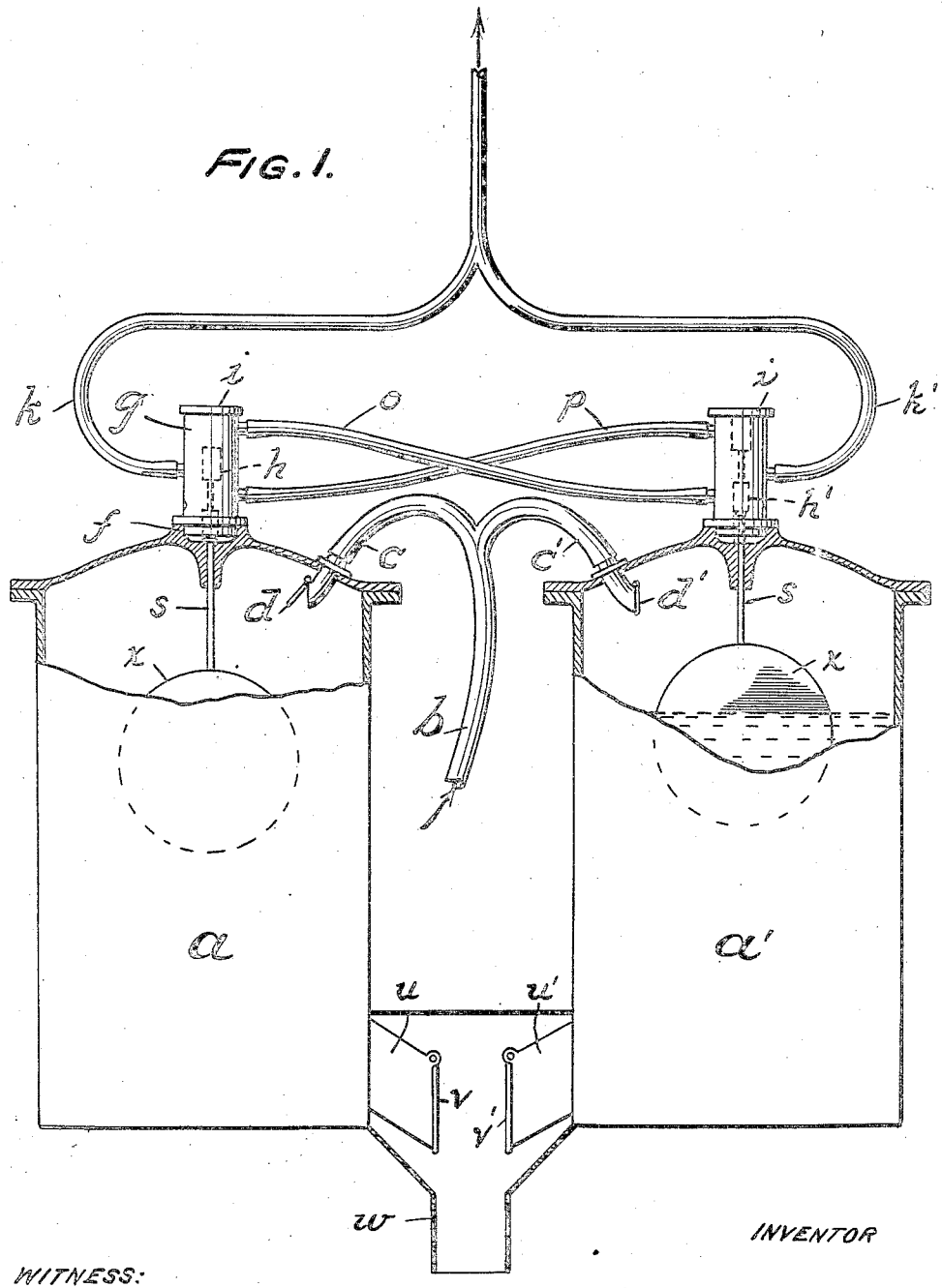

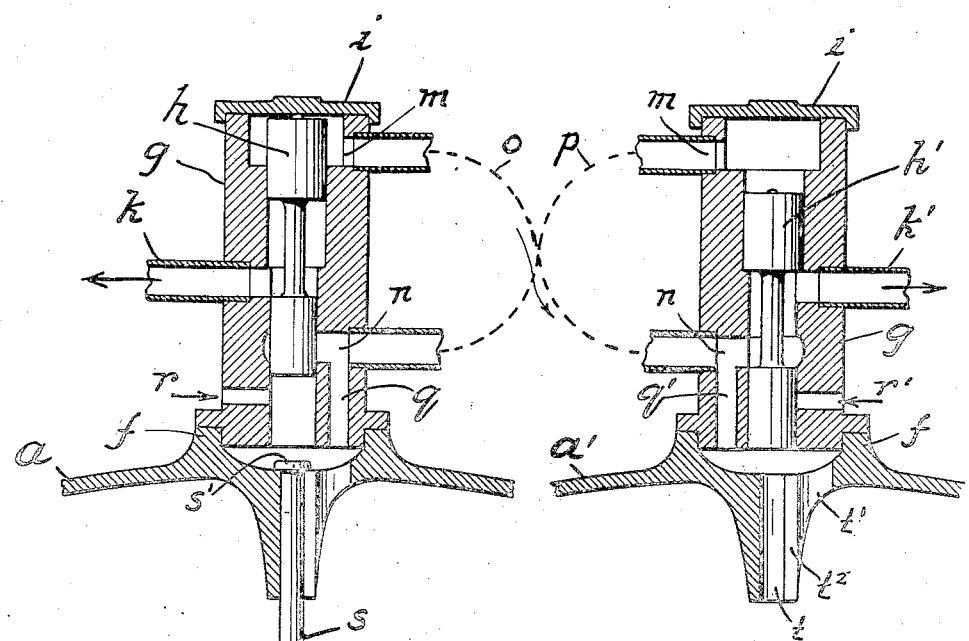
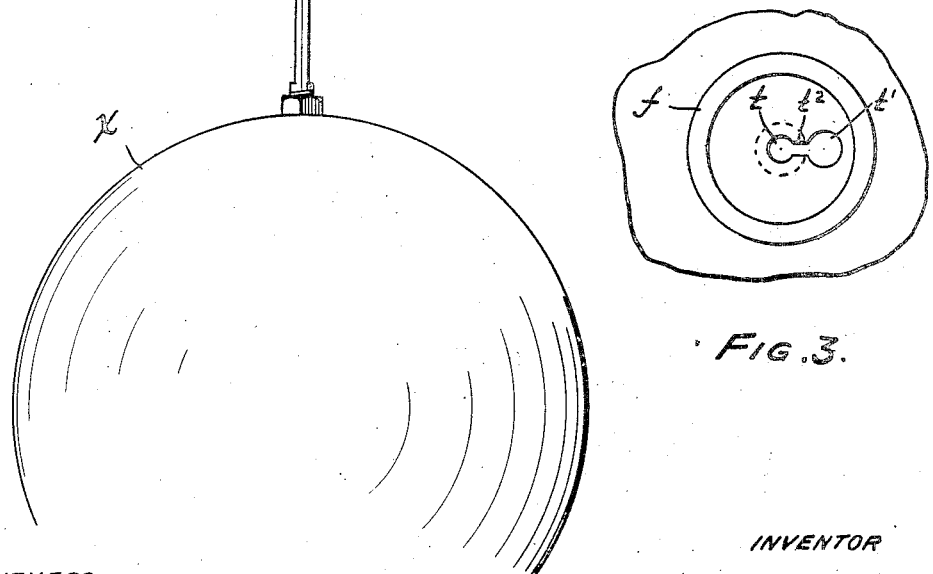

1,844,956

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

CONTINUOUS MILK DELIVERY SYSTEM

Application filed June 13, 1931. Serial No. 544,109.

The ordinary type of "spitting" releaser comprises a receiving chamber and a releasing chamber. The releasing chamber is at regular intervals subjected to high and low pressure (e. g., connected alternately with air and vacuum) to permit, alternately, admission of milk to, and discharge of milk from, the releasing chamber. This frequent intermittent air exhaustion involves great expenditure of power. Moreover, if the pulsations are unequal, the capacity of the releaser is cut down, and the milk in the releaser gradually accumulates, causing flooding. Further, the intermittent discharge of small quantities of milk causes aeration of milk with production of foam.

The object of the present invention is the avoidance of the objections inherent in the ordinary releaser. Specifically, my objects are: avoidance of alternate air admission and exhaust except at relatively very long intervals, the length of an interval being in inverse proportion to the volume of milk entering the releaser; reduction to a minimum of the power required for operation; avoidance of aeration and foaming; and prevention of flooding. These objects are attained in the preferred construction, shown in the accompanying drawings, which is one of many possible embodiments of the invention.

Fig. 1 is an elevation, mainly in section.

Fig. 2 is an enlarged vertical sectional view of the valves and a side elevation of one of the floats. The two valves are shown in the opposite positions which they occupy during normal operation.

Fig. 3 is a detail plan view of the central part of the cover.

Instead of using a single releaser tank, I use two tanks or cans $a$, $a'$, which are or may be identical in construction and have similar connections with the milk supply and the pressure control valve mechanism.

The milk from the teat cups of any milking machine (not shown) flows through a pipe $b$ and thence through either branch pipe $c$ or $c'$, to the corresponding tank $a$ or $a'$. On the discharge end of each branch pipe is a valve ($d$ or $d'$) which opens when the corresponding tank is under suction (partial vacuum) and closes when the corresponding tank is under atmospheric or other relatively high absolute pressure.

The head of each tank is provided with an upstanding, annulus $f$ enclosing a dish-shaped recess, and on this annulus is mounted a valve casing $g$. Through the center of the valve casing extends a valve chamber the upper part of which is somewhat wider than its lower part, and in this valve chamber works a valve having two pistons of different diameters, the larger diameter piston being in the upper and wider part of the valve chamber and the smaller diameter piston being in the lower and narrower part of the valve chamber. One of these valves is lettered $h$ and the other valve is lettered $h'$. Each valve chamber is closed at the top by a head $i$.

Each valve casing has an opening communicating with the central part of the valve chamber and from this opening extends a pipe or other pneumatic conduit which is connected with a source of vacuum. The vacuum pipes of the respective valve casings are lettered $k$ and $k'$.

Each valve casing has a port $m$ communicating with the upper end of the valve chamber, which port, through a pipe or other pneumatic conduit, is connected with a port $n$ in the central part of the lower or narrower part of the valve chamber of the other valve casing. One of these cross-connecting conduits is lettered $o$ and the other is lettered $p$.

Each valve chamber has an atmospheric port communicating with the valve chamber a short distance above its lower end. The air ports of the two valve chambers are lettered $r$ and $r'$ respectively.

Usually the absolute pneumatic pressure in the vacuum conduits will be about half atmospheric pressure.

Each valve chamber is also provided with a port connecting the lower end of the valve chamber with the port $n$. These ports are lettered respectively $q$ and $q'$.

Depending from the head of each tank is a boss in which is formed an opening shaped like that shown in Figs. 2 and 3. This opening comprises two orifices $t$, $t'$, of circular cross-section (one of which is of greater diameter than the other), connected by a neck $t^2$.

A float $x$ is provided with a stem $s$, the lower end of which is of a diameter adapting it to the neck $t^2$ and the upper end of which is of a diameter adapting it to the orifice $t$. The stem has a head $s'$ adapted to the orifice $t'$.

The stem is hung from the cover by passing it upward through orifice $t'$ until the thicker upper end clears the bottom of the dish-shaped recess in the cover, then moving it laterally (the lower thinner end passing through the neck $t^2$) and then allowing it to drop into the position shown in Fig. 2.

The lower ends of the respective tanks, if the tanks are used as releasers, are provided with discharge nozzles $u$, $u'$, equipped with valves $v$, $v'$, which, as in ordinary releasers, close when the tanks are under vacuum and open, under pressure of the milk, when the vacuum is released. The milk from both tanks may discharge into a common funnel $w$ connected with any milk receiver.

Assume that one valve $h$ and the other valve $h'$ are in the position shown in Fig. 2. In this position the upper part of tank $a$ is in free communication with atmosphere. Valve $h$ is held in its upper position by the air pressure on its lower end overbalancing the pressure on its upper end, which, through pipe $o$ and the valve chamber of valve $h'$, is connected with vacuum. The upper part of the tank $a'$ is in communication with vacuum through the vacuum pipe $k'$ and port $q'$, valve $h'$ being held in its lower position by gravity and by air pressure operative on its upper head through port $r$, port $q$ and conduit $p$.

In these positions of the valves $h$ and $h'$, milk flows freely, through pipes $b$ and $c'$, into tank $a'$ and the milk discharge valve $v'$ of tank $a'$ is held closed by atmospheric pressure. Milk rises in tank $a'$ until the corresponding float is immersed to such depth that it floats. Continued rise of milk raises the float until it contacts with the lower end of the valve. At that point the float stops, since, before it can lift the valve, it has a substantial load to overcome, namely, its own weight plus the weight of the valve plus the excess pneumatic pressure on the top of the valve. The milk continues to rise until the float is immersed to such point that its lifting power is more than the weight of the float plus the weight of the valve plus the difference in pressure tending to keep the valve closed. The valve $h'$ is then lifted into the position corresponding to that occupied in Fig. 2 by valve $h$. As soon as the lower edge of the valve clears the lower edge of the atmospheric valve clears the lower edge of the atmospheric port $r'$, air flows through port $r'$ and the lower end of the valve chamber into tank $a'$. Valve $d'$, controlling the milk inlet, closes and valve $v'$ controlling the milk outlet from tank $a'$, opens, due to the weight of the column of milk in the tank, and the milk is discharged therefrom.

Upon the lifting of valve $h'$ air is admitted, through port $r'$, the lower part of the corresponding valve chamber, the port $q$ and conduit $o$, to the upper part of the valve chamber of valve $h$, whereupon, due to the area of the upper head of valve $h$ being greater than that of its lower end, valve $h$ is shifted to a position corresponding to that occupied in Fig. 2 by valve $h'$, and thereupon milk flows into tank $a$ and valve $v$ closes.

From the foregoing description it will be understood that as soon as the milk inflow to one tank starts, the milk starts to outflow from the other tank. The time required to discharge milk from a tank is much less than that required to fill a tank. Therefore, if the tanks are not used as releasers, ample time is afforded, after the flow of milk into one tank is arrested, to remove the filled tank and substitute an empty tank.

In starting, both valves $h$ and $h'$ are in their lower positions, and both tanks will fill simultaneously. Always, however, one tank fills before the other. The valve corresponding to the tank that first fills will thereupon be lifted and the milk will discharge from the filled tank. As soon thereafter as the second tank fills, its corresponding valve will lift, its milk will start to discharge, the valve of the first tank will again move into its lower position and the first tank will again start to fill.

The invention herein set forth involves a substantial simplification of, and improvement on, the continuous milk delivery system described and claimed in a patent issued to me July 7, 1931, No. 1,813,238.

Having now fully described my invention, what I claim and desire to protect by Letters Patent is:

1. A continuous milk delivery system comprising a pair of tanks, a milk inlet to both tanks, a source of suction, ports and passages, valves, one for each tank, each adapted, in one position, to establish connection between a source of higher pressure and one tank and to connect ports and passages adapted to pneumatically shift the other valve into position to establish connection between the source of vacuum and the other tank.

2. A continuous milk delivery system comprising a pair of tanks, a milk inlet to both tanks, a source of suction, valves, one for each tank, each adapted in one position to connect the corresponding tank with the source of suction and in another position to connect the corresponding tank with a source of higher pressure, means operable, when the milk flowing into a tank under suction reaches a predetermined level, to move its corresponding valve into the second specified position, and ports and passages adapted, when either valve is moved into the second specified position, to be so connected that the other valve is pneumatically moved into the first specified position.

3. A continuous milk delivery system comprising a pair of tanks, a milk inlet to both tanks, a source of suction, ports and passages, valves, one for each tank, each adapted, in one position, to establish connection between a source of higher pressure and one tank and to connect ports and passages adapted to pneumatically shift the other valve into position to establish connection between the source of vacuum and the other tank, and means operable, when the milk flowing into the tank connected with a source of suction reaches a predetermined level, to shift the corresponding valve into the first named position.

4. A continuous milk delivery system comprising a pair of tanks, a milk inlet to both tanks, a valve chamber and valve for each tank, each valve chamber having a vacuum port, an atmospheric port, and two air ports, a conduit connecting an air port of one valve chamber with an air port of the other valve chamber, a conduit connecting the other two air ports of the two valve chambers, a valve in each valve chamber adapted in one position to admit atmospheric air from its corresponding atmospheric port to its corresponding tank and also to admit atmospheric air into one of said conduits and thereby effect the shifting of the other valve into position to cut off the connection between the other valve's atmospheric port and the corresponding tank and establish connection between the last named tank and its corresponding vacuum port.

5. A continuous milk delivery system comprising a pair of tanks, a milk inlet to both tanks, a valve chamber and valve for each tank, each valve chamber having a vacuum port, an atmospheric port, and two air ports, a conduit connecting an air port of one valve chamber with an air port of the other valve chamber, a conduit connecting the other two air ports of the two valve chambers, a valve in each valve chamber adapted in one position to admit atmospheric air from its corresponding atmospheric port to its corresponding tank and also to admit atmospheric air into one of said conduits and thereby effect the shifting of the other valve into position to cut off the connection between the other valve's atmospheric port and the corresponding tank and establish connection between the last named tank and its corresponding vacuum port, and means operable, when the milk flowing into the tank communicating with its vacuum port reaches a predetermined level, to effect reversal of the corresponding valve and thereby effect reversal of the other valve.

In testimony of which invention, I have hereunto set my hand, at city of New York, New York, on this 8th day of June, 1931.

CYRUS HOWARD HAPGOOD.